US009510239B2

(12) United States Patent
Wang et al.

(10) Patent No.: US 9,510,239 B2
(45) Date of Patent: Nov. 29, 2016

(54) CONFIGURABLE ARCHITECTURE WITH A CONVERGED COORDINATOR

(75) Inventors: Chonggang Wang, Princeton, NJ (US); Dale N. Seed, Allentown, PA (US); Michael F. Starsinic, Newtown, PA (US); Paul L. Russell, Jr., Pennington, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 113 days.

(21) Appl. No.: 13/984,273

(22) PCT Filed: Feb. 9, 2012

(86) PCT No.: PCT/US2012/024538
§ 371 (c)(1),
(2), (4) Date: Oct. 17, 2013

(87) PCT Pub. No.: WO2012/109478
PCT Pub. Date: Aug. 16, 2012

(65) Prior Publication Data
US 2014/0029434 A1 Jan. 30, 2014

Related U.S. Application Data

(60) Provisional application No. 61/441,125, filed on Feb. 9, 2011.

(51) Int. Cl.
*H04W 28/08* (2009.01)
*H04W 48/18* (2009.01)
(Continued)

(52) U.S. Cl.
CPC ........... *H04W 28/085* (2013.01); *H04W 48/18* (2013.01); *H04W 52/0219* (2013.01);
(Continued)

(58) Field of Classification Search
CPC . H04W 28/08; H04W 28/085; H04W 48/18; H04W 84/10; H04W 84/18
See application file for complete search history.

(56) References Cited

U.S. PATENT DOCUMENTS

2005/0180385 A1* 8/2005 Jeong et al. .................. 370/350
2005/0215265 A1* 9/2005 Sharma ....................... 455/453
2008/0068156 A1* 3/2008 Shimokawa et al. .... 340/539.22

FOREIGN PATENT DOCUMENTS

CN 101035358 A 9/2007
EP 1748597 A1 1/2007
(Continued)

OTHER PUBLICATIONS

IEEE, "IEEE Standard for Information Technology Telecommunications and Information Exchange between Systems—Local and Metropolitan Area Networks Specific Requirements—Part 15.4: Wireless Medium Access Control (MAC) and Physical Layer (PHY) Specifications for Low-Rate Wireless Personal Area Networks (WPANs)", IEEE Computer Society, IEEE Std 802.15.4™-2006, Sep. 8, 2006, 10 pages.

(Continued)

*Primary Examiner* — Ian N Moore
*Assistant Examiner* — Lakeram Jangbahadur
(74) *Attorney, Agent, or Firm* — Condo Roccia Koptiw LLP

(57) ABSTRACT

Methods and apparatus for a configurable architecture with a converged coordinator are described. The converged coordinator may have multiple radio transceivers or interfaces. The converged coordinator may communicate with a plurality of clusters or Personal Area Networks (PANs). The converged coordinator may include a protocol stack with a Convergence Layer and a Converged Medium Access Control (MAC) layer. The converged coordinator may perform channel switching to allow devices to switch from one channel to another (or from one PAN to another). The method may include active channel switching, passive channel switching, and group-based channel switching, as well as two-step active channel switching and one-step active channel switching. The converged coordinator may perform channel switching due to increased congestion or traffic in a particular cluster or PAN. The method may include new messages and fields within messages for use in channel switching.

7 Claims, 12 Drawing Sheets

(51) Int. Cl.
    *H04W 52/02* (2009.01)
    *H04W 28/04* (2009.01)
    *H04W 36/14* (2009.01)
    *H04W 72/04* (2009.01)
    *H04W 84/10* (2009.01)
    *H04W 84/18* (2009.01)
    *H04L 5/06* (2006.01)

(52) U.S. Cl.
    CPC ............. *H04L 5/06* (2013.01); *H04W 28/042* (2013.01); *H04W 36/14* (2013.01); *H04W 72/0453* (2013.01); *H04W 84/10* (2013.01); *H04W 84/18* (2013.01)

(56) References Cited

FOREIGN PATENT DOCUMENTS

| | | |
|---|---|---|
| JP | 2008-072414 A | 3/2008 |
| WO | 2009/014297 A1 | 1/2009 |
| WO | 2009/148752 A2 | 12/2009 |
| WO | WO 2010/117998 A2 | 10/2010 |

OTHER PUBLICATIONS

3GPP $3^{rd}$ Generation Partnership Project; Technical Specification Group Services and System Agents; General Packet Radio Service (GPRS); Service description; Stage 2 (Release 8)', 3GPP Standard; 3GPP TS 23.060, V8.11.0, Dec. 17, 2010, 282 pages.

Ryuta Mizutani et al., "A Clustering Scheme Considering non-uniform Traffic Distribution for Wireless Sensor Networks," IEICE Technical Report, USN, Ubiquitous sensor network, IEICE, Jan. 13, 2011, 6 pages.

Min Suk Kang, et al. "Adaptive Interference-Aware Multi-Channel Clustering Algorithm in a ZigBee Network in the Presence of WLAN Interference," Wireless Pervasive Computing, 2007. ISWPC '07. 2nd International Symposium on, IEEE, Feb. 7, 2017, 6 pages.

Sridhar Rajagopal, et al., "IEEE 802.15.7 VLC PHY/MAC Proposal Samsung/ETRI," IEEE P802.15-09-0733-00-0007, IEEE mentor, Oct. 31, 2009, 8 pages.

* cited by examiner

CONFIGURABLE ARCHITECTURE WITH A CONVERGED COORDINATOR

CROSS REFERENCE TO RELATED APPLICATIONS

This application claims the benefit of U.S. Provisional Application No. 61/441,125 filed Feb. 9, 2011, and PCT application No. PCT/US2012/024538, filed Feb. 9, 2012, the contents of which are hereby incorporated by reference herein.

BACKGROUND

In a typical wireless network, one coordinator typically manages the entire network. For example, in a typical wireless personal area network (PAN) or sensor network, there is typically one PAN coordinator tasked with managing the entire network. For example, the lone PAN coordinator may perform functions such as network initialization and formulation and data transmission. A typical PAN coordinator has at least two physical communication interfaces. For example, the PAN coordinator may have one radio interface for internal communications within the PAN network and another interface as a backhaul for connecting the PAN to external networks. If there are multiple PAN networks, multiple PAN coordinators are required, typically one PAN coordinator for each PAN network. These PAN coordinators are usually deployed separately. Because of the separate deployment, communications and information exchange among them are extremely limited. Accordingly, the use of separate PAN coordinators may cause limitations on system throughput, reliability, and congestion control. For example, a typical PAN coordinator uses only a single radio interface, which may become a bandwidth bottleneck for supporting rate-sensitive multimedia communications over embedded systems, such as Voice over Internet Protocol (VoIP) and video surveillance. Similarly, using a single radio interface introduces a reliability issue at the PAN coordinator. Further, in a single radio interface-based PAN network, congestion may result in the network reducing the sending rate at the source or dropping packets. Furthermore, the lack of information exchange and cooperation among separated PAN coordinators makes it difficult to perform load-balancing or traffic direction among different PAN networks. Accordingly, there are many deficiencies associated with using multiple PAN coordinators that are separated from each other. Thus, the use of a converged coordinator may increase efficiency in a wireless network.

SUMMARY

Methods and apparatus for a configurable architecture with a converged coordinator are described. The converged coordinator may have multiple radio transceivers or interfaces. The converged coordinator may communicate with a plurality of clusters or PANs. The converged coordinator may include a protocol stack with a Convergence Layer and a Converged Medium Access Control (MAC) layer. The converged coordinator may perform channel switching to allow devices to switch from one channel to another (or from one PAN to another). Active channel switching, passive channel switching, and group-based channel switching are described, as well as two-step active channel switching and one-step active channel switching. The converged coordinator may perform channel switching due to increased congestion or traffic in a particular cluster or PAN. Also described are new messages and fields within messages for use in channel switching.

BRIEF DESCRIPTION OF THE DRAWINGS

A more detailed understanding may be had from the following description, given by way of example in conjunction with the accompanying drawings wherein.

DETAILED DESCRIPTION

Figure 1A:
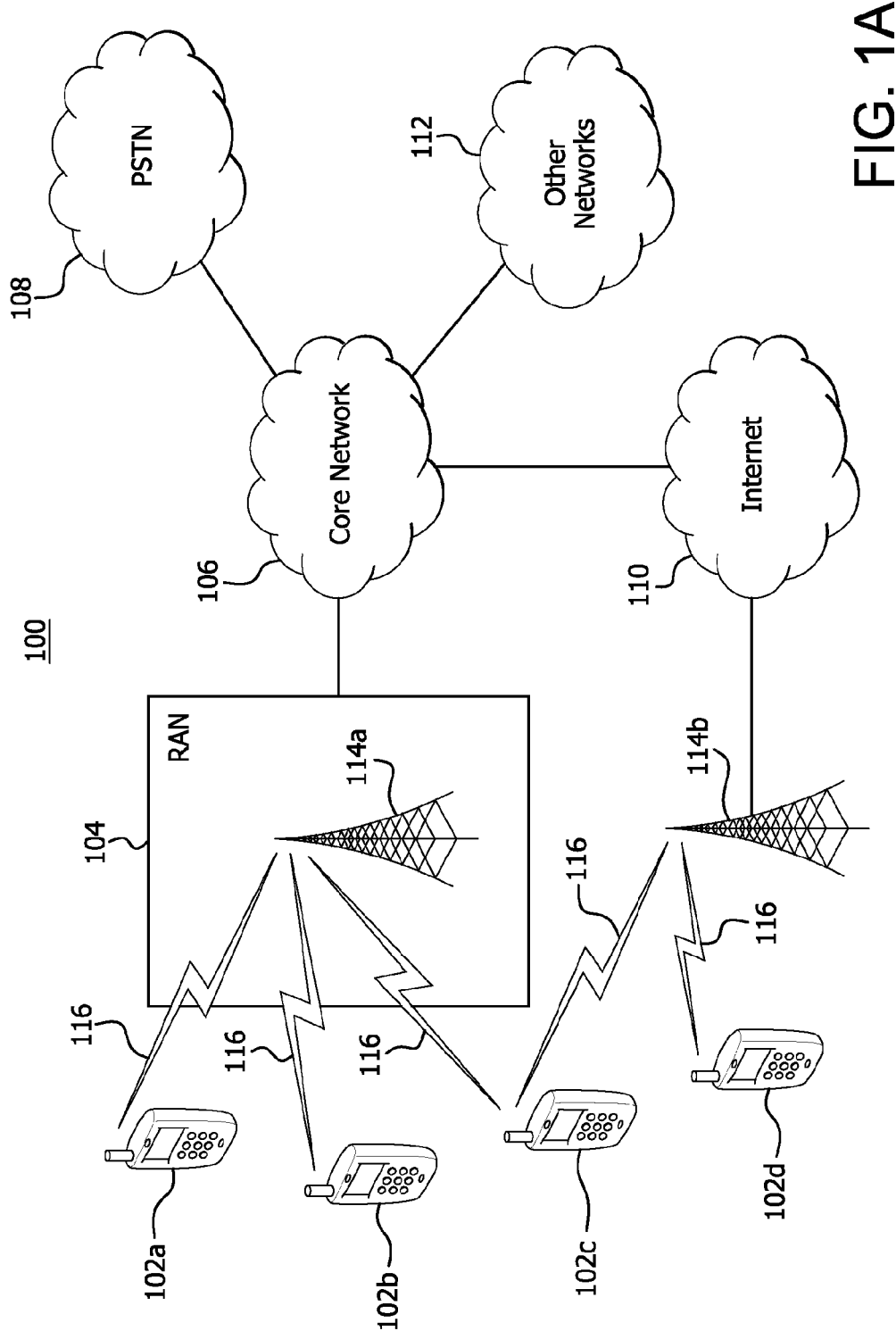
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
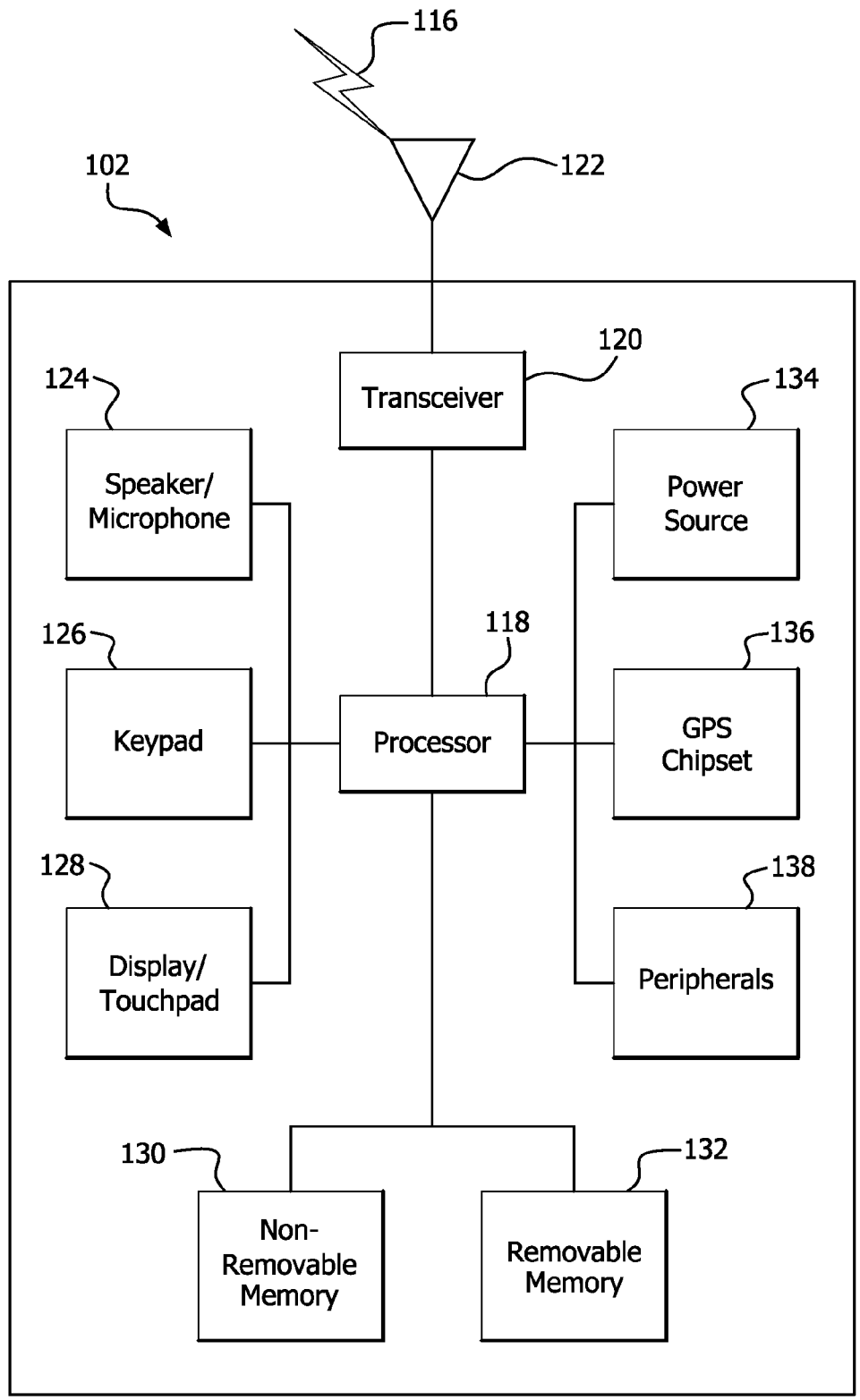
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
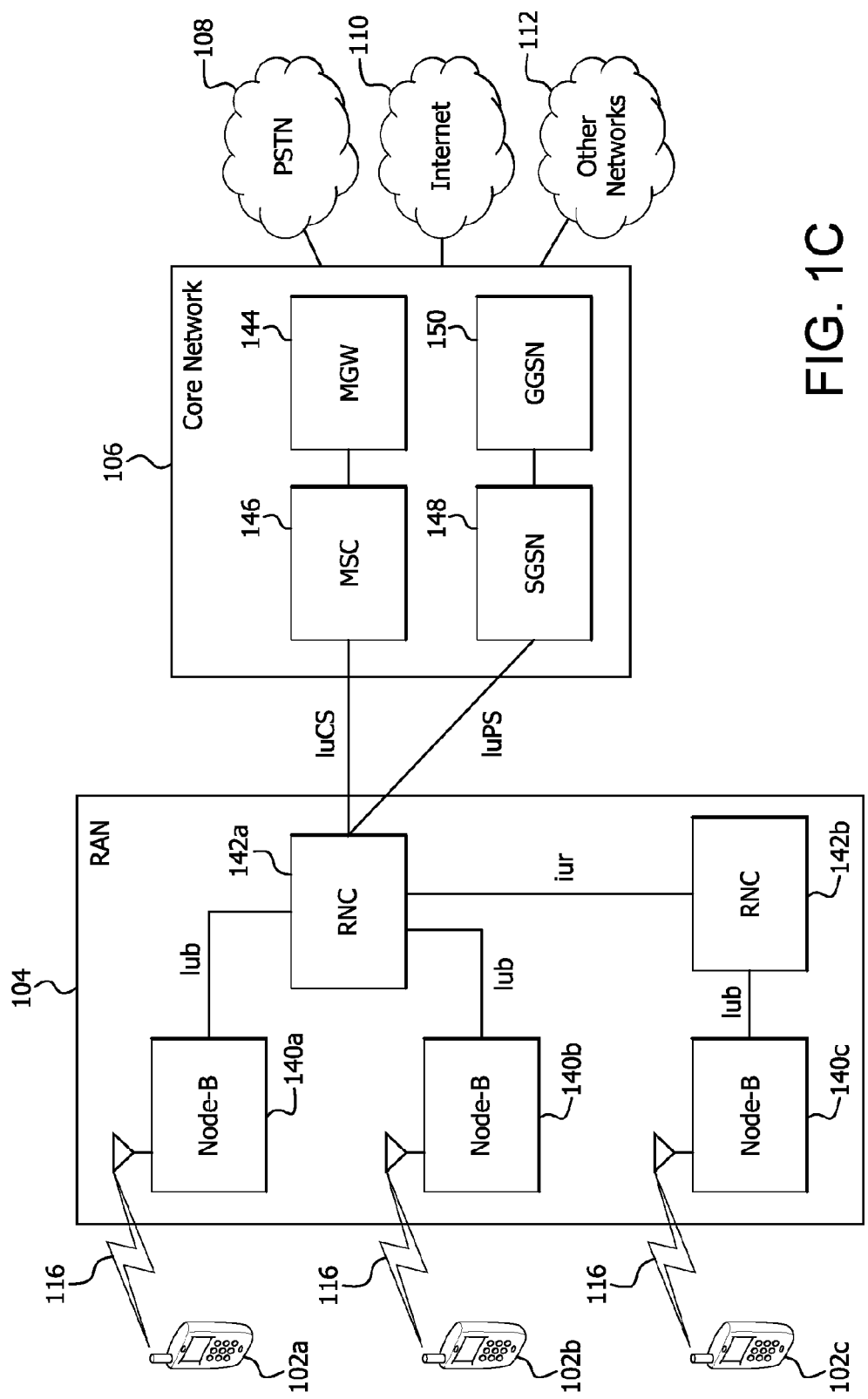
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 2:
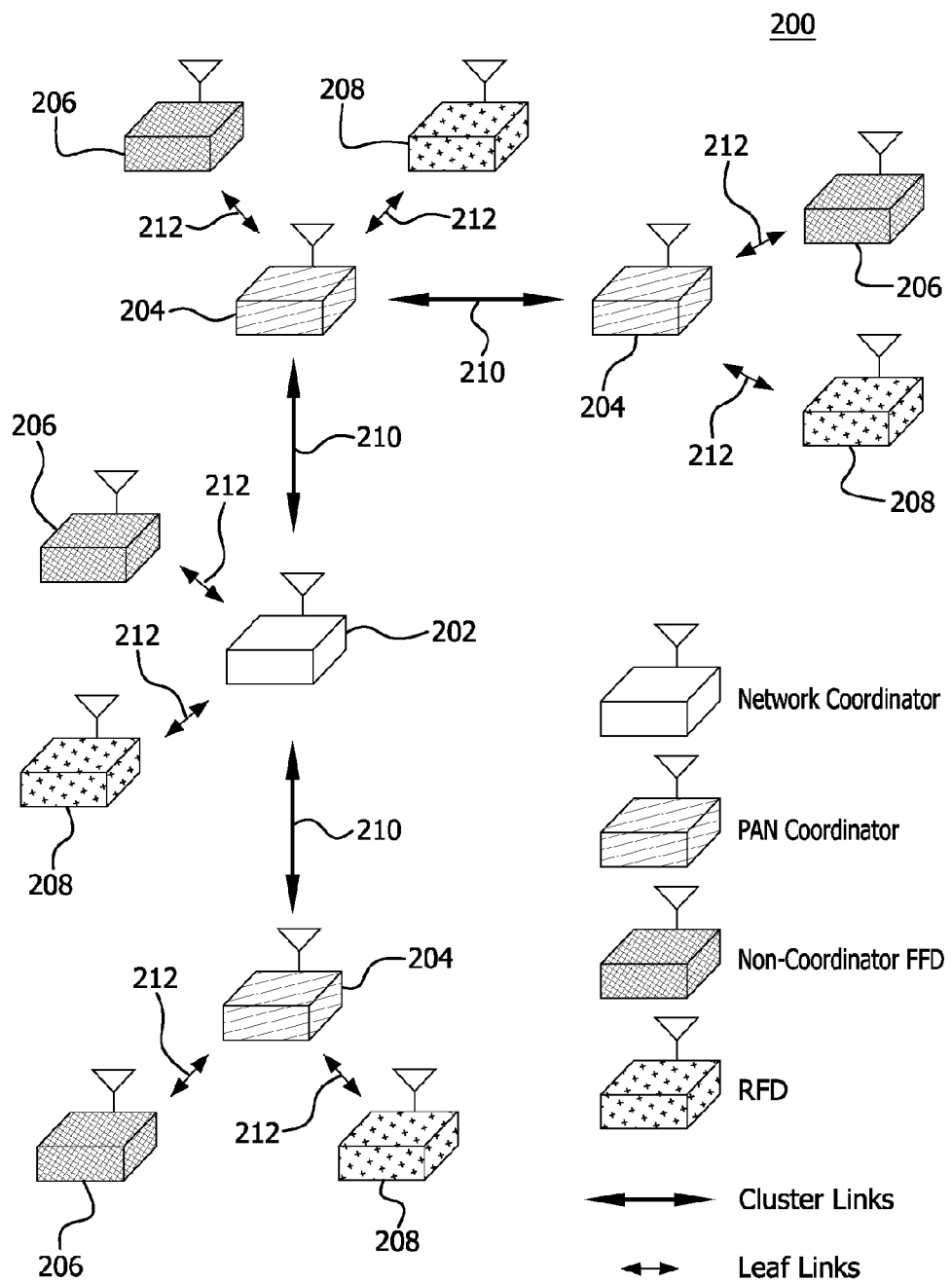
FIG. 2 shows an example network that includes multiple PANs.

FIG. 2 shows an example network 200 that includes multiple PANs. The network 200 is shown in a tree structure and may be considered a cluster tree. The network 200 includes full-function devices (FFDs), which are capable of operating as coordinators, and reduced-function devices (RFDs), which are not capable of acting as coordinators. The network 200 includes a network coordinator 202. The network 200 also includes PAN coordinators 204. Some of the PAN coordinators 204 are in direct communication with the network coordinator 202. One of the PAN coordinators 204 may communicate indirectly with the network coordinator 202 via one of the other PAN coordinators 204. FIG. 2 also shows non-coordinator FFDs 206 and RFDs 208. The non-coordinator FFDs 206 and RFDs 208 may be in direct communication with the network coordinator 202 or may be in communication with the PAN coordinators 204. Cluster links 210 are shown between the network coordinator 202 and the PAN coordinators 204. Cluster links 210 are also shown as communication links between the PAN coordinators 204. Leaf links 212 are shown as communication links between the non-coordinator FFDs 206 and the network coordinator 202 as well as between the non-coordinator FFDs 206 and the PAN coordinators 204. Leaf links 212 are also shown as communication links between the RFDs 208 and the network coordinator 202 as well as between the RFDs 208 and the PAN coordinators 204.

A typical PAN coordinator has many deficiencies that may be solved by using a configurable network architecture with a converged coordinator, which are described herein. For example, for rate-sensitive multimedia applications over sensor networks, the maximum data rate supported by a legacy PAN coordinator may be too small, and a higher data rate may be required. For rate-insensitive applications, there still may be a large number of devices in dense sensor networks, and the total traffic volume generated by all devices may be too high to be accommodated by a legacy PAN coordinator. Further, legacy PAN coordinators do not provide for cooperation and cross-PAN optimization. Finally, the legacy PAN coordinator has only one radio interface, so a single point of failure at the radio interface may endanger the reliability of the entire network.

Due to the deficiencies identified above, a configurable network architecture with a single converged coordinator that eliminates the problems associated with legacy coordinators is described herein. For exemplary purposes only, a PAN architecture is described in detail to show the various embodiments of this disclosure. However, one skilled in the art will recognize that the concepts described herein may be applied to any wired or wireless network. In addition, channel switching methods are described that allow devices to migrate from one channel to another channel, or from one PAN network to another PAN network, if multiple PAN networks exist. The PAN coordinator or converged coordinator may periodically disseminate PAN network information to common coordinators. For example, the network information may include a mapping between a PAN ID and channel frequency. Common coordinators or other devices may then assist channel switching of other devices based on the network information.

More specifically, the configurable architecture and the converged coordinator may have the following features that improve network device coordination. The converged coordinator may have multiple radio interfaces or transceivers. The multiple radio interfaces may allow one or more parallel PANs, working on the same or different channel frequencies, to be controlled by the converged coordinator. A particular device may have only one radio interface and may join (and switch to) any PAN network. The converged coordinator may also power off one or more radio interfaces, provided that at least one radio interface is working properly. Thus, energy consumption may be reduced. If there is only one radio interface currently active, the converged coordinator may optionally function as a typical legacy PAN coordinator. The converged coordinator may have an increased ability to control and manage multiple parallel PANs through increased intelligence. The converged coordinator may also be used to support one application or multiple applications simultaneously. In the case of multiple applications, the converged coordinator may exploit potential features and dependencies of those applications to achieve additional benefits over a typical PAN coordinator.

The converged coordinator and the network may employ several channel switching algorithms. Specifically, active channel switching, passive channel switching, and group-based channel switching procedures are described. Active channel switching may be channel switching triggered by the device itself. Passive channel switching may be channel switching triggered partially or completely by the coordinator. Group-based channel switching may be channel switching triggered by the coordinator and may be used to change the channel of a group of devices simultaneously or at a close point in time. The algorithms used to determine channel switching may be specific to different application scenarios and may be dependent on design objectives.

The proposed configurable architecture and converged coordinator may operate with any existing communications standards. For example, the architecture and converged coordinator may work with any communications standards for WPANs. As a further example, IEEE 802.15.4 is a common communications standard for WPANs and sensor networks. IEEE 802.15.4 provides physical layer (PHY) and medium access control (MAC) layer protocols for low-power low-rate WPANs. In this example, each PAN network may have a single PAN coordinator to control and manage the whole PAN through a single IEEE 802.15.4 radio interface with a maximum data rate up to 250 Kbps. However, the low data rate of the current IEEE 802.15.4 protocols may be a bottleneck for supporting rate-sensitive applications.

In one example of the configurable architecture and converged coordinator, the configurable architecture and converged coordinator may communicate with a network using the IEEE 802.15.4 standard. As an example, IEEE 802.15.4 devices may be used with no modifications to the devices. However, some changes may be made to a typical PAN coordinator and a standard PAN coordinator may be replaced with the converged coordinator described herein. Thus, these changes may occur only at the converged coordinator, which may still use standard IEEE 802.15.4 protocols for communications with other devices. As a result, the converged coordinator may communicate with any standard IEEE 802.15.4 devices and vice versa. Thus, the converged coordinator may be considered compatible with IEEE 802.15.4.

A converged coordinator may have any number of radio transceivers for PAN-side communications. The converged coordinator may also have at least one additional interface. The at least one additional interface may be used for communication with an external network. As an example, the at least one additional interface may provide communication between the converged coordinator and the Internet. A converged coordinator with N radio transceivers may have a frequency for each radio transceiver, denoted as i, such that $f_i(1 \le i \le N)$. As another example, if IEEE 802.15.4 is used, the channel frequency may be mapped to any supported channel. For example, the channel frequency may be a supported channel in any of the 800 MHz, 900 MHz, or 2400 MHz bands, as defined in IEEE 802.15.4. Using each of the N radio transceivers available, the converged coordinator may formulate a maximum of N clusters within a single PAN, whereby each of the N clusters may have the same PAN ID. Similarly, the converged coordinator may formulate a maximum of N parallel PAN networks, whereby each PAN network may have a different PAN ID. Alternatively or additionally, the converged coordinator may formulate some combination of the above, whereby the converged coordinator may formulate clusters within the same PAN along with at least one parallel PAN network. Each of the clusters and/or PAN networks may be controlled and managed by the converged coordinator. The converged coordinator may be a more powerful node than a typical coordinator. Thus, the converged coordinator may have fewer limitations in power supply, storage, and computation as compared to other nodes, such as end devices and common coordinators. Other devices and common coordinators may still exist and may be used in conjunction with the converged coordinator. The other devices and common coordinators may be resource-constrained and may have only one radio transceiver.

At a given time, each radio transceiver in the converged coordinator may be in either working mode or sleeping mode. The converged coordinator may determine whether each radio transceiver is in working mode or sleeping mode. Each radio transceiver in working mode may use the same frequency, may use a different frequency, or may use some combination of the same or different frequencies. If multiple radio transceivers are configured to use the same frequency, single-input multiple-out (SIMO) may be used at the converged coordinator. Alternatively or additionally, multiple-input single-output (MISO) may be used at the devices and/or common coordinators under control of the converged coordinator. The use of SIMO and/or MISO may improve signal quality. If there are M N radio transceivers at the converged coordinator in working mode, each using different frequencies, this may be referred to as M clusters or M parallel PAN networks.

Figure 3A:
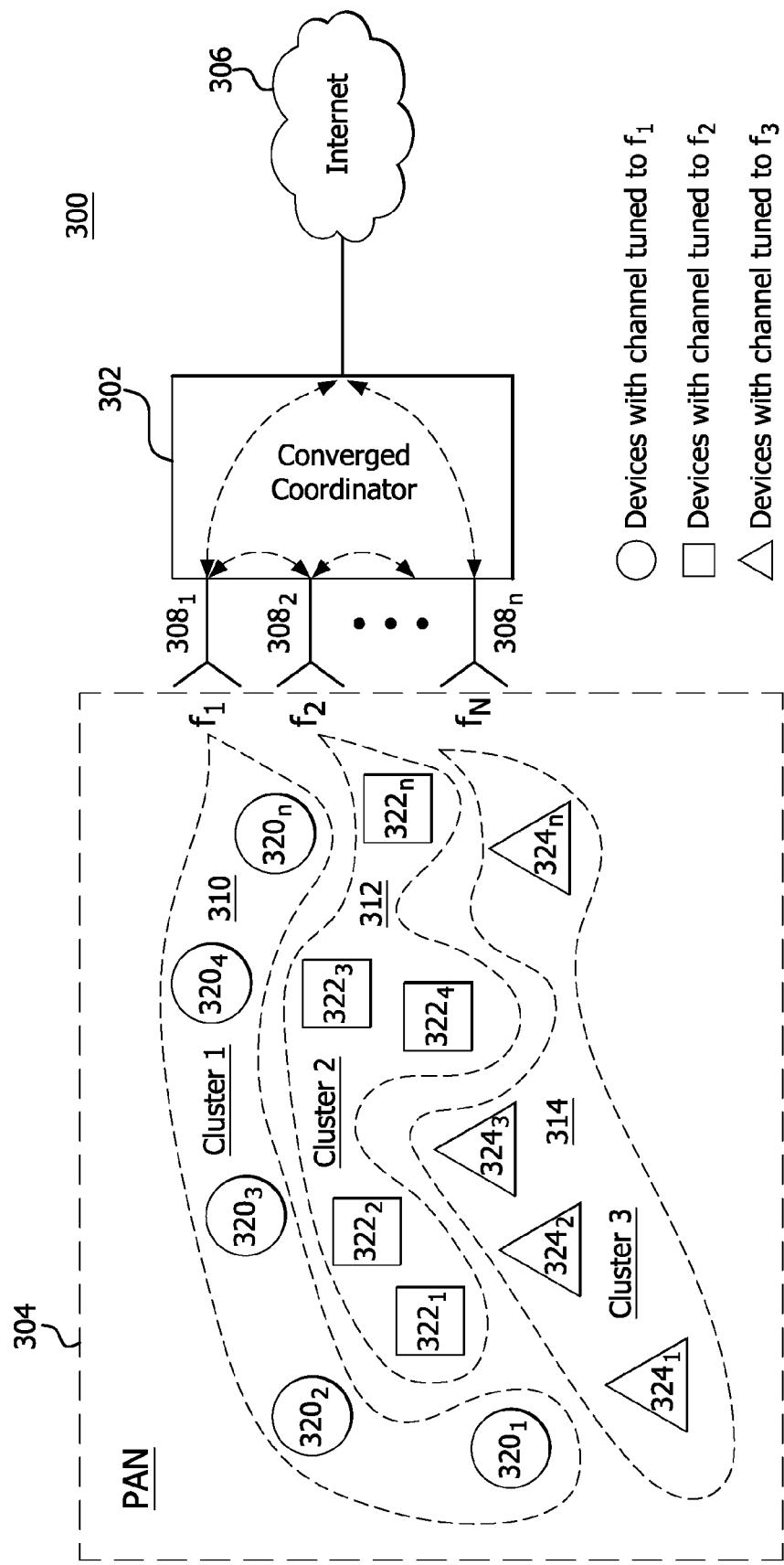
FIG. 3A shows an example of a converged coordinator coordinating a single PAN network with multiple clusters.
Figure 3B:
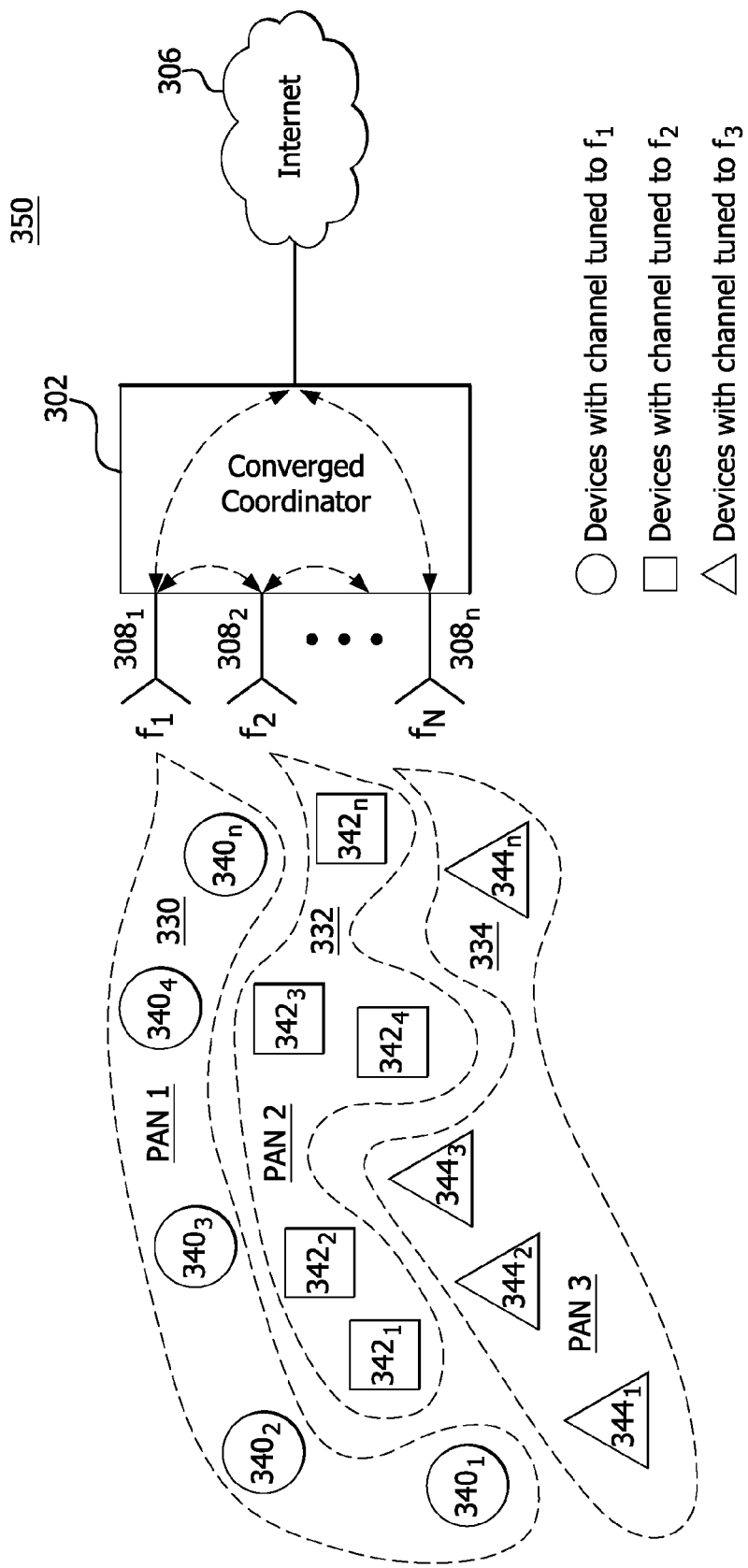
FIG. 3B shows an example of a converged coordinator coordinating multiple PAN networks.

FIGS. 3A and 3B show examples of a converged coordinator coordinating devices that are associated with a variety of PANs and/or clusters. FIG. 3A shows an example 300 of a converged coordinator coordinating a single PAN network with multiple clusters. The converged coordinator 302 may be in communication with and may coordinate a single PAN, shown as PAN 304. The converged coordinator 302 is also shown in communication with the Internet 306. The converged coordinator 302 may also have at least one additional radio transceiver or interface (not shown) for communication with at least one other network or device. The converged coordinator 302 may have any number of radio transceivers $308_1$-$308_n$. The PAN 304 may include three clusters: Cluster 1 310, Cluster 2 312, and Cluster 3 314. The PAN may also include one or more additional clusters that are not shown.

The converged coordinator 302 may communicate with each cluster 310, 312, 314 of the PAN 304 via one or more radio transceivers $308_1$-$308_n$ located at the converged coordinator 302. As an example, one of the radio transceivers $308_1$-$308_n$ may be used to communicate with each cluster 310, 312, 314. As a further example, each of the radio transceivers $308_1$-$308_n$ may communicate with each cluster 310, 312, 314 at a different frequency.

Cluster 1 310 may include any number of devices $320_1$-$320_n$. In the example shown, each of the devices $320_1$-$320_n$ of Cluster 1 310 may be tuned to a first frequency, $f_1$. Also, in this example, each of the devices $320_1$-$320_n$ of Cluster 1 310 may communicate with the converged coordinator 302 via one radio transceiver $308_1$. Cluster 2 312 may include any number of devices $322_1$-$322_n$. In the example shown, each of the devices $322_1$-$322_n$ of Cluster 2 312 may be tuned to a second frequency, $f_2$. Also, in this example, each of the devices $322_1$-$322_n$ of Cluster 2 312 may communicate with the converged coordinator 302 via one radio transceiver $308_2$. Cluster 3 314 may include any number of devices $324_1$-$324_n$. In the example shown, each of the devices $324_1$-$324_n$ of Cluster 3 314 may be tuned to a third frequency, $f_3$. Also, in this example, each of the devices $324_1$-$324_n$ of Cluster 3 314 may communicate with the converged coordinator 302 via one radio transceiver $308_n$.

FIG. 3B shows an example 350 of a converged coordinator coordinating multiple PAN networks. The converged coordinator 302 may be in communication with and may coordinate different PANs 330, 332, 334. As an example, FIG. 3B shows three PANs: PAN 1 330, PAN 2 332, and PAN 3 334. The converged coordinator 302 is also shown in communication with the Internet 306. The converged coordinator 302 may also have at least one additional radio transceiver or interface (not shown) for communication with at least one other network or device. The converged coordinator 302 may have any number of radio transceivers $308_1$-$308_n$. Each PAN 330, 332, 334 may also include one or more additional clusters that are not shown. The converged coordinator 302 may coordinate any number of PANs or clusters, which may not be shown for exemplary purposes.

The converged coordinator 302 may communicate with each PAN 330, 332, 334 via one or more radio transceivers $308_1$-$308_n$ located at the converged coordinator 302. As an example, one of the radio transceivers $308_1$-$308_n$ may be used to communicate with each PAN 330, 332, 334. As a further example, each of the radio transceivers $308_1$-$308_n$ may communicate with each PAN 330, 332, 334 at a different frequency.

PAN 1 330 may include any number of devices $340_1$-$340_n$. In the example shown, each of the devices $340_1$-$340_n$ of PAN 1 330 may be tuned to a first frequency, $f_1$. Also, in this example, each of the devices $340_1$-$340_n$ of PAN 1 330 may communicate with the converged coordinator 302 via one radio transceiver $308_1$. PAN 2 332 may include any number of devices $342_1$-$342_n$. In the example shown, each of the devices $342_1$-$342_n$ of PAN 2 332 may be tuned to a second frequency, $f_2$. Also, in this example, each of the devices $342_1$-$342_n$ of PAN 2 332 may communicate with the converged coordinator 302 via one radio transceiver $308_2$. PAN 3 334 may include any number of devices $344_1$-$344_n$. In the example shown, each of the devices $344_1$-$344_n$ of PAN 3 344 may be tuned to a third frequency, $f_3$. Also, in this example, each of the devices $344_1$-$344_n$ of PAN 3 334 may communicate with the converged coordinator 302 via one radio transceiver $308_n$.

Figure 4:
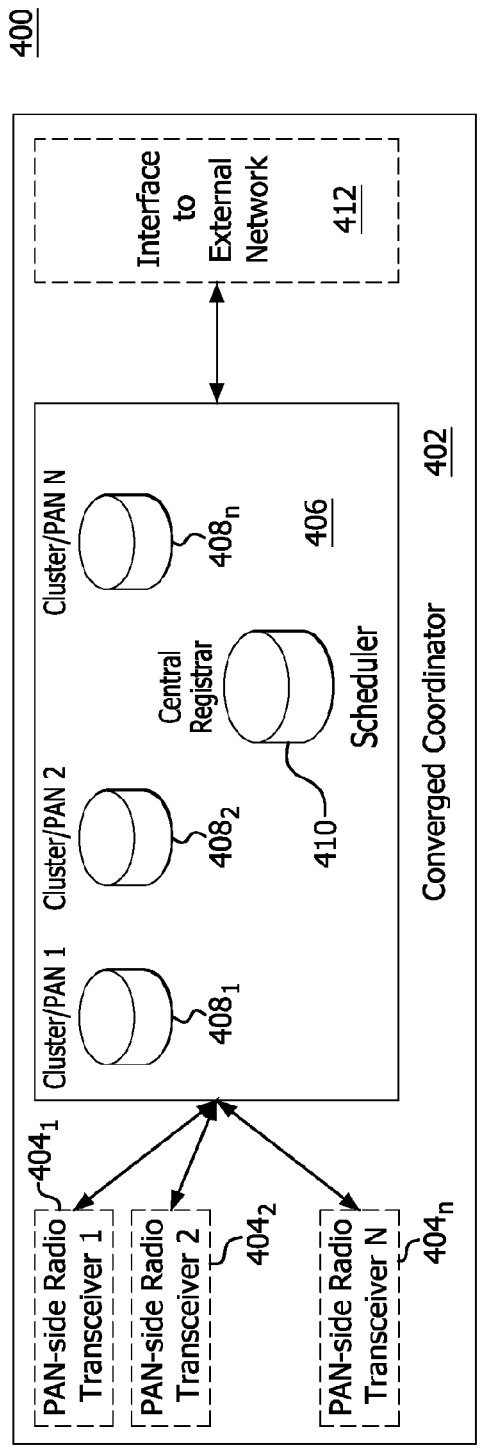
FIG. 4 shows an example architecture of a converged coordinator.

FIG. 4 shows an example architecture 400 of a converged coordinator 402. The converged coordinator 402 may include any number of PAN-side Radio Transceivers $404_1$-$404_n$. The converged coordinator 402 may also include a Scheduler 406. The Scheduler 406 may be used because the converged coordinator 402 may have multiple PAN-side Radio Transceivers $404_1$-$404_n$, unlike a typical PAN coordinator. The Scheduler 406 may collect information from each of the PAN-side Radio Transceivers $404_1$-$404_n$ for each of one or more Clusters/PANs $408_1$-$408_n$. The information collected for each of the Clusters/PANs $408_1$-$408_n$ may include, for example, traffic load and/or the number of associated devices. The Scheduler 406 may perform one or more of the following functions. The Scheduler 406 may open a transceiver on a specific frequency or channel, may close a transceiver, may change the frequency of an active transceiver, may instruct a device to change its frequency and/or switch to another PAN or cluster, may change the device duty-cycle schedule, and/or may send or instruct a device into a sleep state. The Scheduler 406 may also maintain a Central Registrar 410 that may include information related to all associated devices. For example, the Central Registrar 410 may maintain a count of the number of PANs or clusters. For each PAN or cluster, the Central Registrar 410 may maintain one or more of: the working frequency for each PAN/cluster, the transceivers allocated for each PAN/cluster, the radio quality for each PAN/cluster, the MAC protocols for each PAN/cluster, the traffic estimation for each PAN/cluster (which may include traffic load, packet loss ratio, delay, and/or the like), and/or the devices associated with each PAN/cluster. Further, for example, the following information may be maintained for each device: the residual energy, the generated traffic, the location, the services and/or applications running on the device, and/or device duty-cycle information. Based on the information included in the Clusters/PANs $408_1$-$408_n$ and the Central Registrar 410, the Scheduler 406 may make decisions regarding the number of clusters or PANs to open. The Scheduler 406 may also make decisions regarding timing arrangements for the clusters or PANs. Similarly, the Scheduler 406 may also determine the number of radio transceivers to use at a given time. The Scheduler 406 may also determine the cluster and/or PAN for which each device should be included and/or attached. The Scheduler 406 may consider factors such as, for example, load balancing, congestion control, reliability, isolation, and/or protection. The Scheduler 406 may also be responsible for routing PAN traffic to or from an Interface to an External Network 412. The Scheduler 406 may also route PAN traffic among the PAN-side Radio Transceivers $404_1$-$404_n$.

Figure 5:
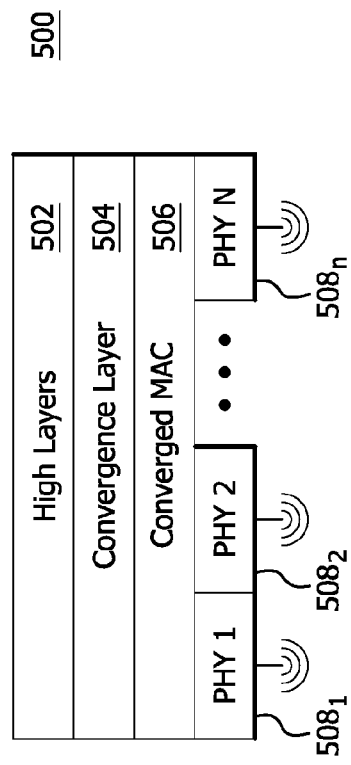
FIG. 5 shows an example protocol stack for a converged coordinator.

FIG. 5 shows an example protocol stack 500 for a converged coordinator. The protocol stack 500 may include higher layers 502. The higher layers 502 may be the same as other higher layers of a typical protocol stack. The converged coordinator may introduce two new layers to the protocol stack 500. A Convergence Layer 504 may be added to the protocol stack 500. The Convergence Layer 504 may perform mapping between applications and the available multiple PAN networks supported by the converged coordinator. A Converged MAC 506 may also be added to the protocol stack 500. The Converged MAC 506 may use one unified MAC protocol to jointly manage multiple radio transceivers. In the control plane, the Converged MAC 506 may conduct optimized device association and registration. In the data plane, the Converged MAC 506 may perform cross-PAN optimization, such as, for example, congestion control and load-balancing. The Scheduler 406 shown in FIG. 4 and described above may be implemented across both the Convergence Layer 504 and the Converged MAC 506. The Converged MAC 506 may be designed based on existing WPAN standards, such as, for example, IEEE 802.15.4. The Converged MAC 506 may also include new functions based on the operation of the converged coordinator described herein. The Converged MAC 506 may also be an extension to existing standards and may be incorporated into existing standards, such as, for example, WPAN standards. The protocol stack 500 may also include a plurality of physical layers (PHY) $508_1$-$508_n$ as in existing protocol stacks.

The converged coordinator described herein may allow a device to be associated with any cluster and/or parallel PAN network. The converged coordinator may allow the device to switch or migrate among or between the clusters and/or PAN networks. The switching or migrating may be based on network conditions and particular design goals, such as, for example, congestion control, load balancing, isolation, protection, reliability, service differentiation, and/or interference management. Thus, cross-cluster or cross-PAN optimization may be conducted by jointly considering the properties of each cluster and/or PAN network. The properties considered for device switching or migration may include, for example, link properties, node properties, and network properties. For example, the devices and/or coordinators may collect statistics related to any of the properties, conditions, or design goals described above. The statistics may include, for example, packet delivery ratio and/or channel clear assessment (CCA) failures. These statistics may be forwarded to the converged coordinator to allow for detection of congestion and interference issues. Similarly, the statistics may be used by a device or a coordinator (or any combination of devices and coordinators) to request permission, from the converged coordinator, to switch channels. This may allow the converged coordinator to provide benefits such as, for example, faster over-the-air software management, load-balancing, reliability, and the like. The following are examples of congestion control via the converged coordinator described herein.

Figure 6A:
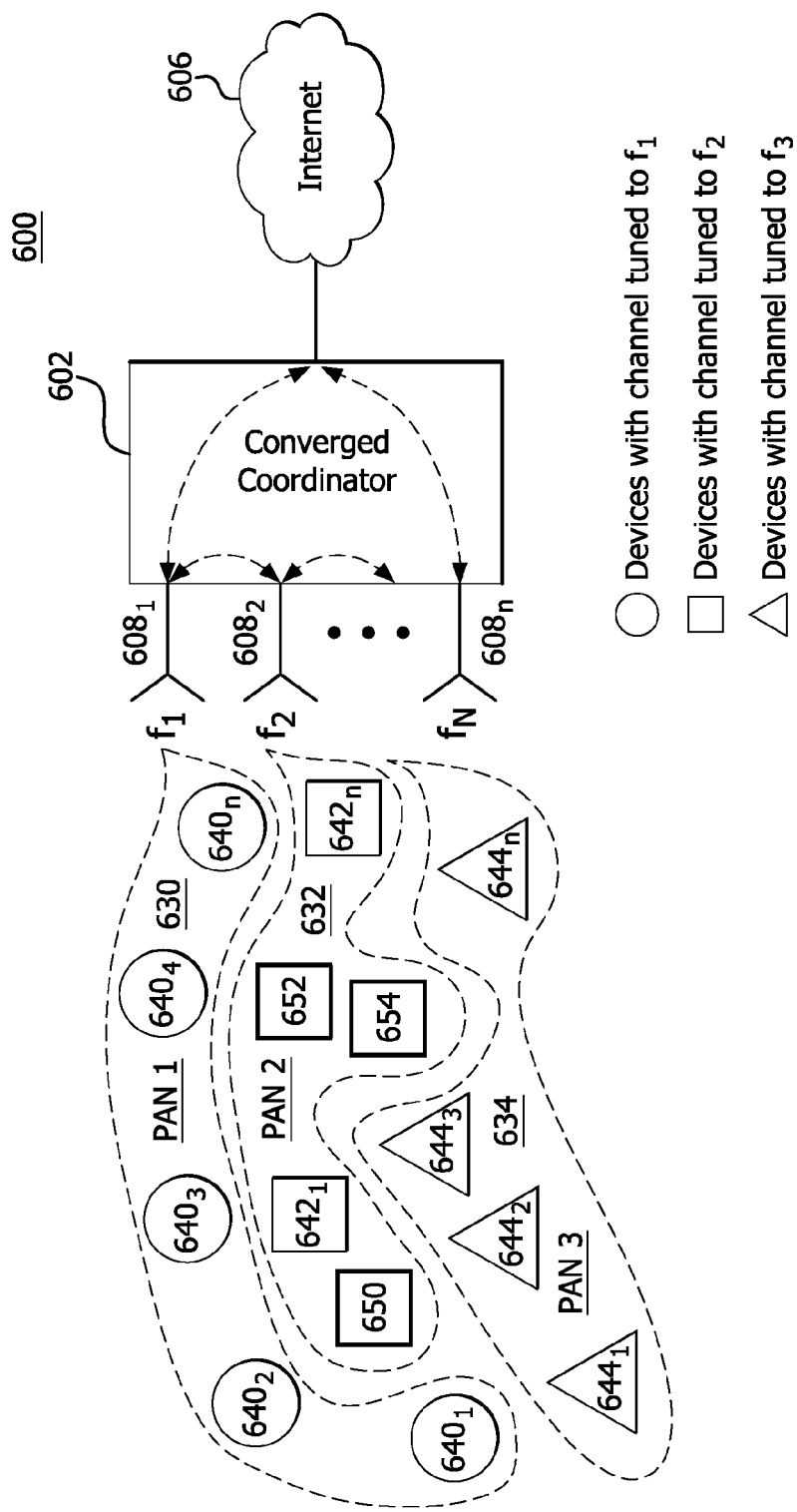
FIG. 6A shows an example of a network before channel switching.
Figure 6B:
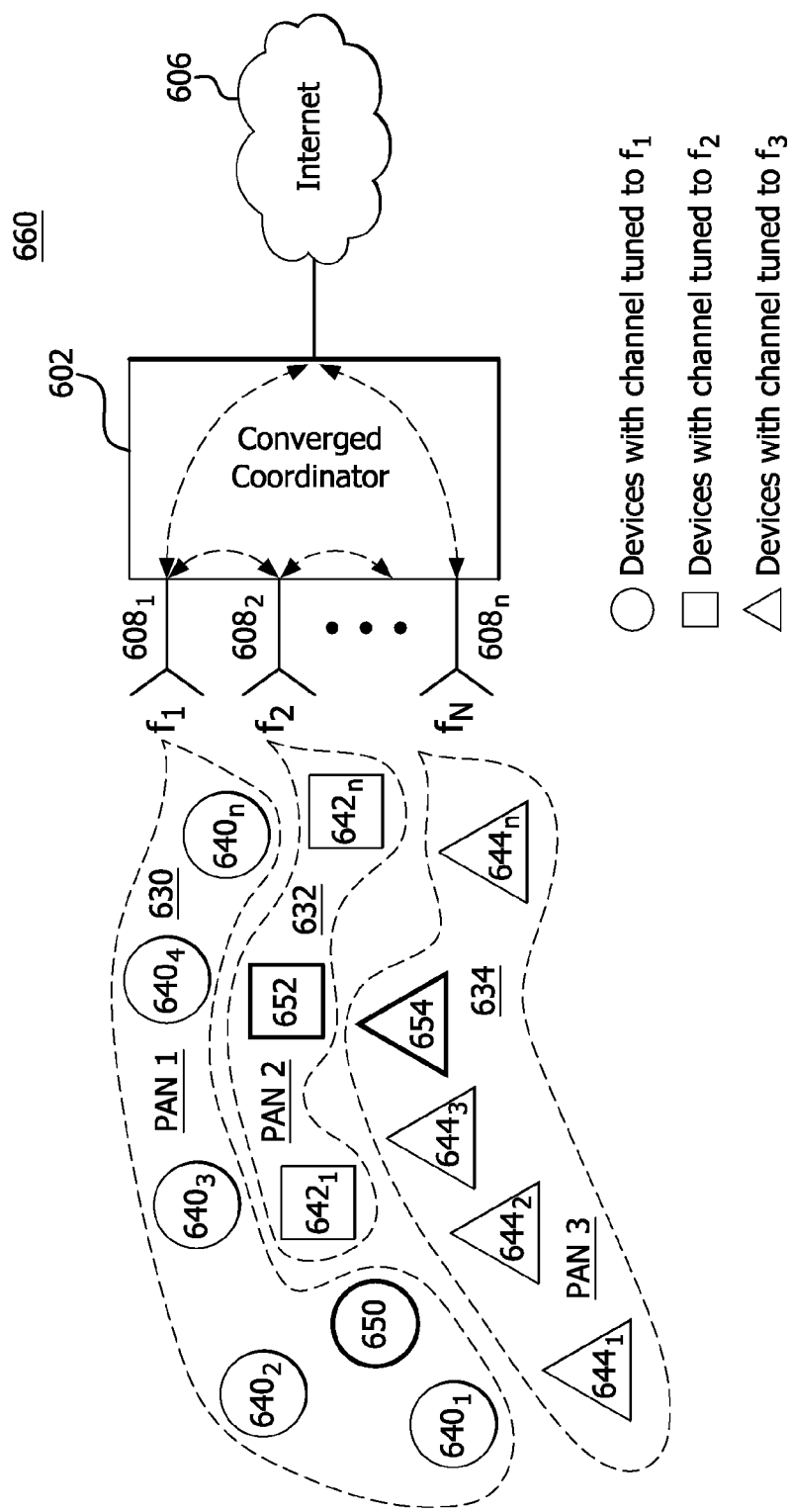
FIG. 6B shows an example of a network after channel switching is performed.

FIGS. 6A and 6B show an example of congestion control performed by the converged coordinator. FIG. 6A shows an example 600 of a network before channel switching. Similar to FIG. 3B described above in detail, FIG. 6A shows the converged coordinator 602 in communication with the Internet 606 and multiple PANs 630, 632, 634.

The converged coordinator 602 may coordinate each of the PANs 630, 632, 634. As an example, FIG. 6A shows three PANs: PAN 1 630, PAN 2 632, and PAN 3 634. The converged coordinator 602 is also shown in communication with the Internet 606. The converged coordinator 602 may also have at least one additional radio transceiver or interface (not shown) for communication with at least one other network or device. The converged coordinator 602 may have any number of radio transceivers $608_1$-$608_n$. Each PAN 630, 632, 634 may also include one or more additional clusters that are not shown. The converged coordinator 602 may coordinate any number of PANs or clusters, which may not be shown for exemplary purposes.

The converged coordinator 602 may communicate with each PAN 630, 632, 634 via one or more radio transceivers $608_1$-$608_n$ located at the converged coordinator 602. As an example, one of the radio transceivers $608_1$-$608_n$ may be used to communicate with each PAN 630, 632, 634. As a further example, each of the radio transceivers $608_1$-$608_n$ may communicate with each PAN 630, 632, 634 at a different frequency.

PAN 1 630 may include any number of devices $640_1$-$640_n$. In the example shown, each of the devices $640_1$-$640_n$ of PAN 1 630 may be tuned to a first frequency, $f_1$. Also, in this example, each of the devices $640_1$-$640_n$ of PAN 1 630 may communicate with the converged coordinator 602 via one radio transceiver $608_1$. PAN 2 632 may include any number of devices $642_1$-$642_n$. In the example shown, each of the devices $642_1$-$642_n$ of PAN 2 632 may be tuned to a second frequency, $f_2$. Also, in this example, each of the devices $642_1$-$642_n$ of PAN 2 632 may communicate with the converged coordinator 602 via one radio transceiver $608_2$. PAN 3 634 may include any number of devices $644_1$-$644_n$. In the example shown, each of the devices $644_1$-$644_n$ of PAN 3 644 may be tuned to a third frequency, $f_3$. Also, in this example, each of the devices $644_1$-$644_n$ of PAN 3 634 may communicate with the converged coordinator 602 via one radio transceiver $608_n$.

In FIG. 6A, three of the devices $642_1$-$642_n$ of PAN 2 632 are shown as Device A 650, Device B 652, and Device C 654. In this example, Device A 650, Device B 652, and Device C 654 may be in use and may be causing an increased traffic load in PAN 2 632. Because all three devices are associated with PAN 2 632, PAN 2 632 may be experiencing congestion from the high traffic load. Accordingly, it may be desirable for the converged coordinator 602 to switch one or more of Device A 650, Device B 652, or Device C 654 to either PAN 1 630 or PAN 3 634.

FIG. 6B shows an example 660 of a network after channel switching is performed. The converged coordinator 602, the Internet 606, and the three PANs 630, 632, 634 are similar elements to those described in detail with respect to FIG. 6A. In FIG. 6B, Device A 650 may be switched or migrated to PAN 1 630. Similarly, Device C 654 may be switched or migrated to PAN 3 634. Device B 652 may remain in PAN 2 632. Accordingly, Device A 650, Device B 652, and Device C 654, the high traffic devices, may now each be in a different PAN. As described above in detail, the switching or migrating may be performed by the converged coordinator 602. The converged coordinator 602 may make the determination to switch or migrate the devices independently. The converged coordinator 602 may make this determination based on any of the conditions, design goals, or strategies described herein. Alternatively or additionally, a coordinator of any of the PANs or any of the devices may request the switching or migration.

One skilled in the art will recognize that each of the PANs used in this example may also be clusters within a single PAN. Further, one skilled in the art will recognize that any number of PANs and/or clusters may be used, and the particular number used herein is for exemplary purposes only.

Channel switching may be performed via either active channel switching or passive channel switching. Active channel switching may be triggered by a particular device. For example, a device may monitor and predict its local traffic and transit traffic. As a further example, if the total traffic, which may include the local and transit traffic, exceeds a predetermined threshold and potential congestion occurs, the device may seek to move to another PAN or cluster. For example, the device may attempt to change its frequency and associate with another PAN or cluster. Similarly, if the device senses that the current channel is interfered with by other radio signals, the device may change its channel to a different channel.

If a device that attempts to change its channel is a "critical point," then any child devices may also change their frequency along with the device. A node may be a critical point for a network if the whole network will be disjointed by the removal of the node. Thus, changing the frequency of the child devices may allow those devices to remain in communication with a PAN coordinator or a converged coordinator, depending on the network setup. This may be especially applicable to a multi-hop mesh topology. To allow for efficient active channel switching, a device may maintain a list of available PAN networks (or clusters) and their associated frequencies.

Figure 7:
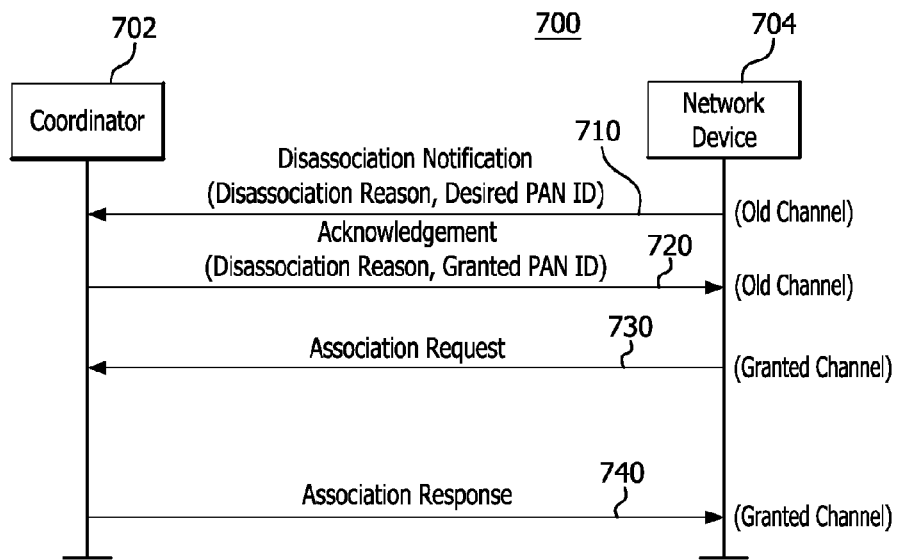
FIG. 7 is an example call-flow diagram showing two-step active channel switching.
Figure 8:
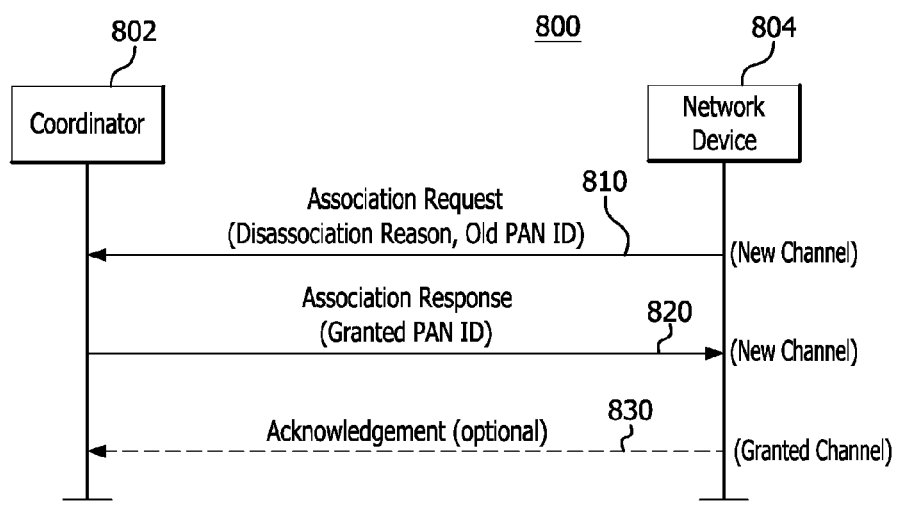
FIG. 8 is an example call-flow diagram showing one-step active channel switching.

Active channel switching may be performed via either two-step active channel switching (TSACS) or one-step active channel switching (OSACS). FIGS. 7 and 8 show examples of TSACS and OSACS, respectively.

FIG. 7 is an example call-flow diagram 700 showing two-step active channel switching. FIG. 7 shows a coordinator 702 and a network device 704. The network device 704 may send a Disassociation Notification 710 to the coordinator 702. The Disassociation Notification 710 may be used to indicate that the network device 704 wants to move from an old channel to a new channel. The Disassociation Notification 710 may include, for example, a Disassociation Reason and/or a Desired PAN ID. Thus, the Desired PAN ID may be piggybacked over the Disassociation Notification 710. The network device 704 may include the current PAN ID as the Destination PAN Identifier Field. The coordinator 702 address may be included in a Destination Address field. The Disassociation Notification 710 may be transmitted over the old channel, meaning that the Disassociation Notification 710 may be sent over the current network that the network device 704 is associated with (before the channel switch).

The coordinator 702 may transmit an Acknowledgement 720 to the network device 704. The Acknowledgement 720 may be in response to the Disassociation Notification 710. The Acknowledgement 720 may include, for example, a Disassociation Reason and/or a Granted PAN ID. The Granted PAN ID may the Desired PAN ID that was requested by the network device 704 in the Disassociation Notification 710. The Granted PAN ID may also be another PAN ID that the coordinator 702 assigns. The Acknowledgement 720 may be transmitted over the old channel.

The network device 704 may transmit an Association Request 730 to the coordinator 702. The Association Request 730 may be sent in response to the Acknowledgement 720. The Association Request 730 may be sent over the new PAN network using the new channel. The new PAN Network and new channel may correspond to the Granted PAN ID indicated in the Acknowledgement 720. The coordinator 702 may transmit an Association Response 740 to the network device 704. The Association Response 740 may be transmitted in response to the Association Request 730.

One skilled in the art will recognize that the message names and the order of the messages described above are for exemplary purposes only. Any combination of the signaling described above may be performed in any order. Further, the coordinator shown may be a converged coordinator or a PAN coordinator. In some examples, the coordinator shown may represent signaling to or from both a converged coordinator and a PAN coordinator. Thus, the coordinator shown may represent signaling performed by either or both of a converged coordinator and/or PAN coordinator.

FIG. 8 is an example call-flow diagram showing one-step active channel switching (OSACS). FIG. 8 shows a coordinator 802 and a network device 804. The network device 804 may transmit an Association Request 810 to the coordinator 802. Similarly, the network device 804 may transmit a Disassociation Notification instead of an Association Request 810. The Association Request 810 (or Disassociation Notification) may be transmitted over a new channel. Thus, using OSACS, the network device 804 may transmit only one command message instead of both a Disassociation Notification and an Association Request. The Association Request 810 (or Disassociation Notification) may piggyback information related to the old PAN. In this way, the coordinator 802 may gain knowledge regarding where the network device 804 came from.

The coordinator 802 may transmit an Association Response 820 to the network device 804. The Association Response 820 may be transmitted in response to the Association Request 810. The Association Response 820 may be transmitted over the new channel, which was used by the network device 804 to transmit the Association Request 810. The Association Response 820 may include, for example, a Granted PAN ID. The Granted PAN ID may be the PAN ID corresponding to the new channel that the network device 804 used to transmit the Association Request 810. The Granted PAN ID may also be a different PAN ID if the coordinator 802 decides that the new channel is not approved. The coordinator 802 may grant a different channel to the network device 804 and may notify the network device 804 of that channel via the Association Response 820 and the Granted PAN ID. The coordinator 802 may request that the network device 804 transmits an acknowledgement over the granted channel. Optionally, the network device 804 may transmit an Acknowledgement 830 to the coordinator 802. The Acknowledgement 830 may be transmitted in response to the Association Response 820. The Acknowledgement 830 may be transmitted via the granted channel indicated in the Association Response 820 and the Granted PAN ID.

One skilled in the art will recognize that the message names and the order of the messages described above are for exemplary purposes only. Any combination of the signaling described above may be performed in any order. Further, the coordinator shown may be a converged coordinator or a PAN coordinator. In some examples, the coordinator shown may represent signaling to or from both a converged coordinator and a PAN coordinator. Thus, the coordinator shown may represent signaling performed by either or both of a converged coordinator and/or PAN coordinator.

Channel switching may also be performed via passive channel switching. Using passive channel switching, a PAN coordinator or converged coordinator may trigger the channel switching. The coordinator may monitor the whole network as well as particular PANs. For example, if congestion occurs or is predicted to occur in a PAN, the coordinator may instruct one or more devices in the congested PAN to disassociate with the congested PAN and re-associate with another PAN.

Figure 9:
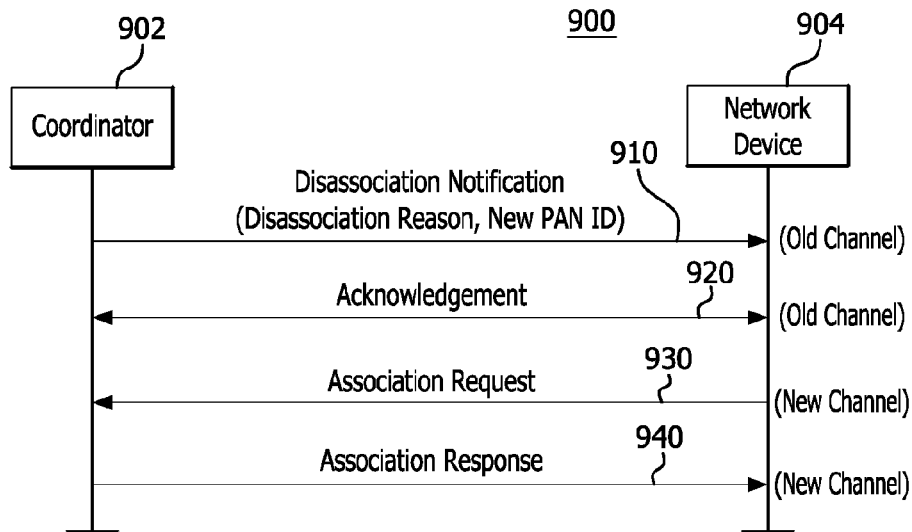
FIG. 9 is an example call-flow diagram showing passive channel switching using an explicit acknowledgement command.

FIG. 9 is an example call-flow diagram 900 showing passive channel switching using an explicit acknowledgement command. FIG. 9 includes a coordinator 902 and a network device 904. The coordinator 902 may decide that the network device 904 should be switched or migrated to another PAN and/or channel. The coordinator 902 may transmit a Disassociation Notification 910 to the network device 904. The Disassociation Notification 910 may include, for example, a Disassociation Reason and/or a New PAN ID. The Disassociation Notification 910 may be transmitted over the old channel. The New PAN ID may be the identification of the PAN that the coordinator 902 wants the network device 904 to switch or migrate to.

The network device 904 may transmit an Acknowledgement 920 to the coordinator 902. The Acknowledgement 920 may be transmitted in response to the Disassociation Notification 910. The Acknowledgement 920 may be transmitted over the old channel. The network device 904 may also transmit an Association Request 930 to the coordinator 902. The Association Request 930 may be transmitted over the new channel. The new channel may be the channel corresponding to the Disassociation Notification 910 and the New PAN ID. The coordinator 902 may transmit an Association Response 940 to the network device 904. The Association Response 940 may be transmitted in response to the Acknowledgement 920 and/or the Association Request 930. The Association Response 940 may be transmitted over the new channel.

One skilled in the art will recognize that the message names and the order of the messages described above are for exemplary purposes only. Any combination of the signaling described above may be performed in any order. Further, the coordinator shown may be a converged coordinator or a PAN coordinator. In some examples, the coordinator shown may represent signaling to or from both a converged coordinator and a PAN coordinator. Thus, the coordinator shown may represent signaling performed by either or both of a converged coordinator and/or PAN coordinator.

Figure 10:
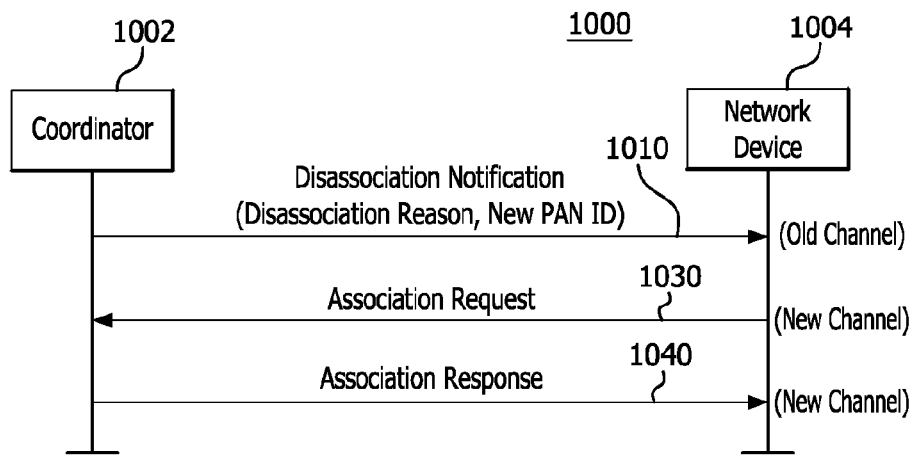
FIG. 10 is an example call-flow diagram showing passive channel switching without using an explicit acknowledgement command.

FIG. 10 is an example call-flow diagram 1000 showing passive channel switching without using an explicit acknowledgement command. FIG. 10 includes a coordinator 1002 and a network device 1004. The coordinator 1002 may decide that the network device 1004 should be switched or migrated to another PAN and/or channel. The coordinator 1002 may transmit a Disassociation Notification 1010 to the network device 1004. The Disassociation Notification 1010 may include, for example, a Disassociation Reason and/or a New PAN ID. The Disassociation Notification 1010 may be transmitted over the old channel. The New PAN ID may be the identification of the PAN that the coordinator 1002 wants the network device 1004 to switch or migrate to.

The network device 1004 may transmit an Association Request 1030 to the coordinator 1002. The Association Request 1030 may be transmitted in response to the Disassociation Notification 1010. An acknowledgement may be incorporated with the Association Request 1030. Thus, the Association Request 1030 may be used as both an association request and an acknowledgement to the Disassociation Notification 1010, and a separate acknowledgement message may not need to be transmitted from the network device 1004 to the coordinator 1002. The Association Request 1030 may be transmitted over the new channel. The new channel may be the channel corresponding to the Disassociation Notification 1010 and the New PAN ID. The coordinator 1002 may transmit an Association Response 1040 to the network device 1004. The Association Response 1040 may be transmitted in response to the Association Request 1030. The Association Response 1040 may be transmitted over the new channel.

One skilled in the art will recognize that the message names and the order of the messages described above are for exemplary purposes only. Any combination of the signaling described above may be performed in any order. Further, the coordinator shown may be a converged coordinator or a PAN coordinator. In some examples, the coordinator shown may represent signaling to or from both a converged coordinator and a PAN coordinator. Thus, the coordinator shown may represent signaling performed by either or both of a converged coordinator and/or PAN coordinator.

Group-based channel switching may also be used to switch more than one device to another PAN. Any device or coordinator may request permission from a PAN coordinator or converged coordinator to the device and any child devices to another PAN. A coordinator may make the request on behalf of devices in its cluster. This may expedite channel switching compared to channel switching performed on an individual-device basis. This may be beneficial, for example, if interference is localized to a particular group of devices. Allowing devices to switch channels as a group, rather than individually, may allow parent/child relationships to be maintained during the switch. Allowing parent/child relationships to be maintained during the switch may reduce the amount of time that it takes a network to "heal" or "form" after the switch.

Figure 11:
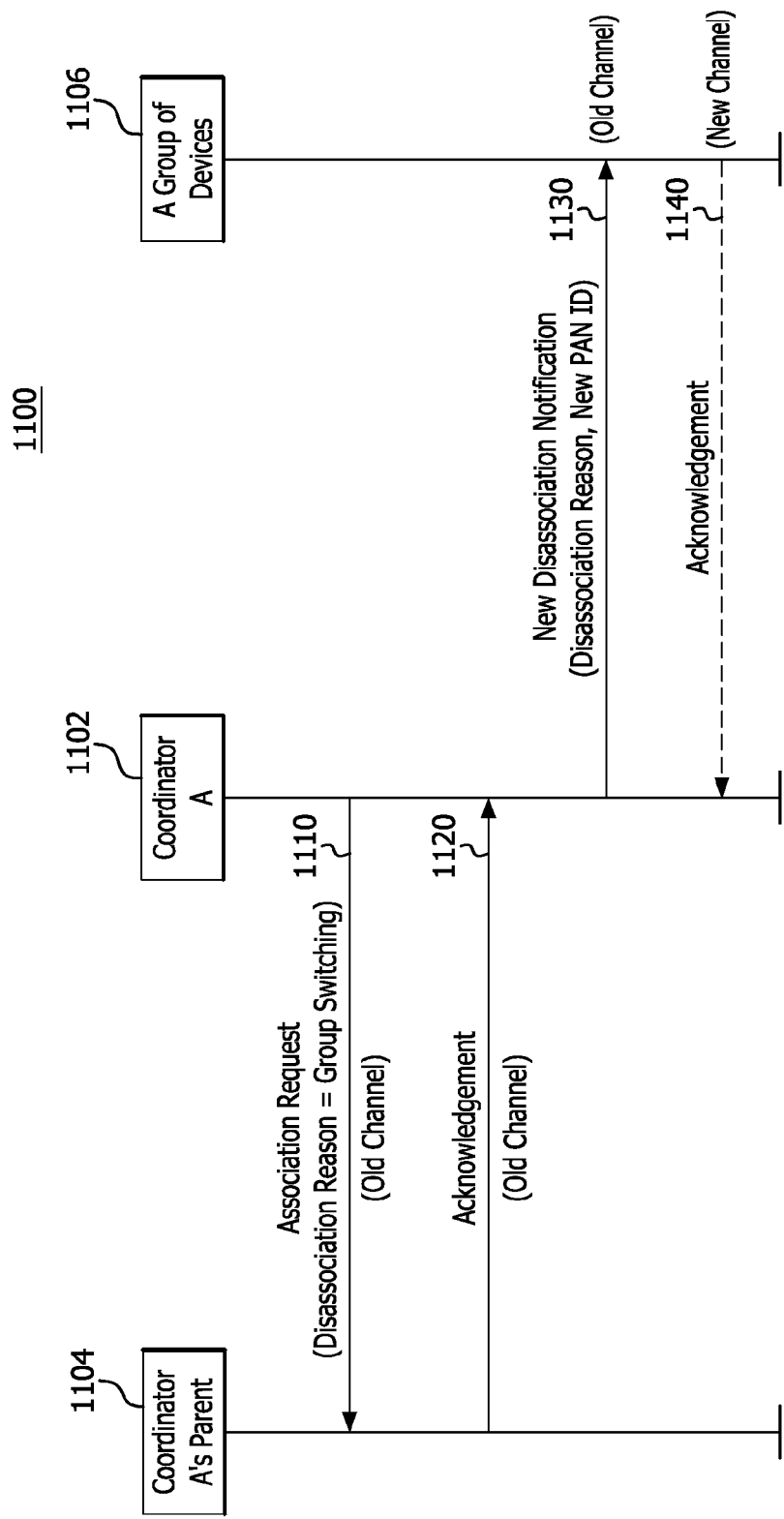
FIG. 11 is an example call-flow diagram showing group-based channel switching.

FIG. 11 is an example call-flow diagram 1100 showing group-based channel switching. FIG. 11 shows Coordinator A 1102, a Parent Coordinator 1104, and a group of devices 1106. For example, Coordinator A 1102 may be a router within a network or any node that acts as a parent to other nodes. Also for example, the Parent Coordinator 1104 may be a gateway or a typical PAN coordinator. The Parent Coordinator 1104 may be a parent node with respect to Coordinator A 1102.

Coordinator A 1102 may transmit an Association Request 1110 to the Parent Coordinator 1104. The Association Request 1110 may indicate to the Parent Coordinator 1104 that a group switch needs to be performed. For example, the Association Request 1110 may include a Disassociation Reason and the Disassociation Reason may include an indication that group switching is to be performed. The Association Request 1110 may also include a New PAN ID based on a new channel or PAN that Coordinator A 1102 is requesting to use. Coordinator A 1102 may perform the Association Request 1110 on behalf of the group of devices 1106, which may be a cluster of devices under the control of Coordinator A 1102. The Association Request 1110 may be transmitted via the old channel.

The Parent Coordinator 1104 may transmit an Acknowledgement 1120 to Coordinator A 1102. The Acknowledgement 1120 may be transmitted in response to the Association Request 1110. The Acknowledgement 1120 may be transmitted via the old channel.

Coordinator A 1102 may transmit a New Disassociation Notification 1130 to the group of devices 1106. The New Disassociation Notification 1130 may be used to notify the group of devices 1106 that the group of devices 1106 is to be moved to another channel. The New Disassociation Notification 1130 may include a Disassociation Reason and/or a New PAN ID. The New Disassociation Notification 1130 may be transmitted via the old channel. If the group of devices 1106 are all child devices of Coordinator A 1102 and Coordinator A 1102 wants each of the group of devices 1106 to switch, Coordinator A 1102 may set a broadcast address as the destination address for the New Disassociation Notification 1130. Thus, each of the group of devices 1106 may receive the New Disassociation Notification 1130 via the broadcast and may trigger group switching. If Coordinator A 1102 wants a subset of the group of devices 1106 or a subset of the child devices to switch, the New Disassociation Notification 1130 may piggyback the address of the particular devices that are to be switched. For example, Coordinator A 1102 may use a list of the short addresses of the group of devices 1106 or use a Bloom Filter technique to reduce command frame length.

Each device in the group of devices 1106 that are to be switched may transmit an Acknowledgement 1140 to Coordinator A 1102. The Acknowledgement 1140 may be transmitted via the new channel. The new channel may be the channel that was indicated in the New PAN ID and/or the New Disassociation Notification 1130. The Acknowledgement 1140 may be transmitted using carrier sensing multiple access (CSMA) to potentially avoid collisions. Transmitting the Acknowledgement 1140 may be optional.

One skilled in the art will recognize that the message names and the order of the messages described above are for exemplary purposes only. Any combination of the signaling described above may be performed in any order.

In any of the channel-switching approaches described above, a device may wish to switch to another channel or another PAN because it has lost the ability to communicate with other devices. For example, communication may be lost due to interference, mobility, or the like. If a loss of communication occurs, a device may rely on a pre-configured alternate PAN ID and channel. A coordinator may also use the same technique if the coordinator cannot communicate with any parent nodes. In this example, the coordinator may maintain communication with child nodes, but may have lost communication with parent nodes. The use of an alternate PAN by a coordinator or device may allow the coordinator or device to move itself, and potentially its children, to the alternate PAN to regain communication with other coordinators or nodes.

The use of a converged coordinator may provide several benefits compared to traditional PAN networks with individual PAN coordinators. For example, using a converged coordinator may allow for faster over-the-air software management. The converged coordinator may have multiple radio transceivers, each of which may be working simultaneously for downlink software distribution and upgrades. For example, each transceiver may work for a subset of end devices, thus allowing quicker over-the-air software management. Further, the use of a converged coordinator may control congestion in the network. If congestion occurs in a typical PAN, a normal solution is to throttle the source traffic rate or drop packets. This typically caused low system throughput and wasted energy consumption. However, the configurable architecture associated with a converged coordinator may handle congestion in a better manner. For example, as described above in detail, traffic may be re-directed from a congested PAN or cluster to an underloaded PAN or cluster without reducing source traffic rate or dropping any packets.

Further, use of a converged coordinator may help load balancing. If multiple clusters and/or parallel PANs are available, a converged coordinator may divide total traffic evenly among them. This may be performed regardless of whether or not there is congestion in a cluster or PAN. Remaining battery power capacity may be considered in load balancing, so that each cluster or PAN may have similar traffic load and better performance in terms of consumed energy, packet collisions, and latency in each network. A converged coordinator may also allow for better quality of service (QoS). A variety of devices and applications may co-exist in a PAN environment. For example, some applications, such as reporting, require low latency while other applications have less of a latency requirement. Using IEEE 802.15.4 as an example, a contention free period (CFP) through guaranteed time slots (GTS) may be enabled. In this scenario, the converged coordinator may spread the delay-sensitive devices across the clusters or PANs. For example, each cluster or PAN may receive a particular number of delay-sensitive devices, so that each device may have its own GTS. If CFP is disabled and the traffic load from delay sensitive devices is low, the converged coordinator may organize delay-sensitive devices in a particular cluster or PAN and may organize delay-tolerant devices in other clusters or PANs. In this way, differentiated QoS may be provided to different devices.

As another example, a converged coordinator may improve reliability. If one channel is unavailable, the converged coordinator may switch PAN devices quickly to other channels. For example, one channel may be jammed by unknown external devices. Additionally, by spreading devices across multiple channels, devices in other channels may not be impacted if one channel experiences heavy interference. Further, a converged coordinator may provide improved energy efficiency. If traffic is low, the converged coordinator may open a limited number of transceivers. Similarly, the converged coordinator may set up a limited number of PANs to reduce energy consumption. In one example, the converged coordinator may set up two transceivers, with one transceiver acting as the primary transceiver and one transceiver acting as a backup transceiver. If the total traffic increases, the converged coordinator may open additional transceivers as necessary. The converged coordinator may then configure multiple clusters or PANs. As a result, the number of collisions in each network may be reduced and energy efficiency may be improved.

As another example, signal quality may be improved via the use of a converged coordinator. The converged coordinator may assign multiple radio transceivers to use the same frequency and may utilize multiple-input multiple-output (MIMO) to improve signal quality if the radio environment is not ideal. For example, the converged coordinator may configure multiple radio receivers on the same frequency to exploit SIMO to improve received signal quality from devices without introducing any overhead at the device side. The use of a converged coordinator may also improve isolation and protection. Some devices may be malicious and may generate abnormal traffic. However, the converged coordinator may place normal devices in one cluster or PAN, separated from the malicious devices.

Each of the coordinators, converged coordinators, devices, and network devices described in the examples provided above may be a WTRU or any other wired or wireless device. The descriptions and names used in the examples provided above are for exemplary purposes only and are not intended to limit the type or function of the coordinators and devices.

Embodiments

1. A method for configurable personal area network (PAN) architecture comprising:
utilizing a single converged network coordinator.

2. The method as in embodiment 1, further comprising:
utilizing channel switching by devices to migrate from one channel to another channel.

3. The method as in embodiment 1, further comprising:
utilizing channel switching by devices to migrate from one PAN to another PAN.

4. The method as in any one of the preceding embodiments wherein a PAN coordinator or converged coordinator periodically disseminates PAN information, such as the mapping between PAN identification (ID) and channel frequency, to common coordinators.

5. The method as in any one of the preceding embodiments wherein a common coordinator assists a device's channel switching based on PAN information.

6. The method as in any one of the preceding embodiments wherein a converged coordinator has multiple radio interfaces or transceivers.

7. The method as in any one of the preceding embodiments wherein multiple radio interfaces formulate one or multiple parallel PAN networks working on the same or different channel frequencies, under the control of the converged coordinator.

8. The method as in any one of the preceding embodiments wherein a device has only one radio interface and can join or switch to any PAN network.

9. The method as in any one of the preceding embodiments wherein the converged coordinator powers off some radio interfaces provided that at least one radio is working properly and if there is only one radio interface currently active, the converged coordinator collapses to the legacy PAN coordinator.

10. The method as in any one of the preceding embodiments wherein the converged coordinator is used to support one application or multiple applications simultaneously.

11. The method as in any one of the preceding embodiments, further comprising:
utilizing active channel switching, passive channel switching, or group-based channel switching procedures, wherein active channel switching is triggered by the device itself; passive channel switching is triggered completely by the coordinator; and group-based channel switch is triggered by the coordinator and is used to change a group of devices' channel simultaneously.

12. The method as in any one of the preceding embodiments wherein configurable architecture and converged coordinator work with any communications standards for WPAN, including Institute of Electrical and Electronics Engineers (IEEE) 802.15.4-2006.

13. The method as in any one of the preceding embodiments wherein each PAN network has a single PAN coordinator to control and manage the whole PAN through a single IEEE 802.15.4-2006 radio interface.

14. The method as in any one of the preceding embodiments wherein one converged coordinator has N radio transceivers for PAN-side communications and at least one other interface to connect the coordinator to an external network, the frequency for each transceiver i is $f_i(1 \leq i \leq N)$.

15. The method as in any one of the preceding embodiments wherein with N radio transceivers available, the converged coordinator formulates at most N clusters with the same PAN ID, or N parallel PAN networks each having a different PAN ID, or a combination thereof.

16. The method as in any one of the preceding embodiments wherein clusters or PAN networks are fully controlled and managed by the converged coordinator.

17. The method as in any one of the preceding embodiments wherein every radio transceiver in the converged coordinator is in either working or sleeping mode, which is determined by the converged coordinator.

18. The method as in any one of the preceding embodiments wherein every working radio transceiver in the converged coordinator uses different, or the same frequency, or a combination.

19. The method as in embodiment 18 wherein if multiple radio transceivers are configured to use the same frequency, single-input-multiple-output (SIMO) at the converged coordinator and multiple-input-single-output (MISO) at devices or common coordinators are exploited to improve signal quality furthermore.

20. The method as in any one of the preceding embodiments wherein devices and common coordinators exist, which are resource-constrained and have only one radio transceiver, the same as those in the converged coordinator.

21. The method as in any one of the preceding embodiments wherein the converged coordinator which is equipped with N PAN-side radio transceivers.

22. The method as in any one of the preceding embodiments wherein the converged coordinator has a new functional entity Scheduler.

23. The method as in embodiment 22 wherein the scheduler performs collecting information from each radio transceiver for each single cluster or PAN network and maintains a centralized registrar for all devices.

24. The method as in embodiment 22 wherein the scheduler makes decisions about the time and the number of clusters or PAN networks to open or the number of radio transceivers to turn on.

25. The method as in embodiment 22 wherein the scheduler determines the cluster or PAN network which each device should attach to for purposes such as load balance, congestion control, reliability, or isolation/protection, and the scheduler is responsible for routing PAN traffic to/from the interface to external network, and/or among PAN-side radio transceivers.

26. The method as in any one of the preceding embodiments wherein the converged coordinator introduces two new layers; converged MAC and convergence layer.

27. The method as in any one of the preceding embodiments wherein the converged MAC uses one unified MAC protocol to jointly manage N radio transceivers.

28. The method as in any one of the preceding embodiments wherein the converged MAC conducts optimized device association and registration in the control plane and the converged MAC performs cross-PAN optimization such as congestion control and load-balancing in the data plane.

29. The method as in any one of the preceding embodiments wherein the convergence layer performs mapping between applications to the available multiple PAN networks and the Scheduler is implemented across both converged MAC and convergence layer.

30. The method as in any one of the preceding embodiments wherein a device associates with any one of the cluster or parallel PAN networks and switches or migrate among them depending on network conditions and design goals.

31. The method as in any one of the preceding embodiments wherein cross-cluster or cross-PAN optimization is conducted by jointly considering properties of each cluster/PAN network including link properties, node properties, or network properties.

32. The method as in any one of the preceding embodiments wherein the devices or coordinators collect statistics and local statistics are forwarded to the converged coordinator so that congestion and interference issues are detected or these statistics get used by a device or a coordinator (or a group of them) to decide to ask the converged coordinator for permission to switch channels.

33. The method as in any one of the preceding embodiments, further comprising:
    active channel switching.

34. The method as in embodiment 33 wherein active channel switching is triggered by the device.

35. The method as in any one of embodiments 33-34 wherein a device monitors and predicts its local traffic or transit traffic and if the total traffic (local or transit) exceeds a threshold and potential congestion is occurring, the device changes its frequency and associates with another PAN.

36. The method as in any one of embodiments 33-35 wherein a device or a node is a critical point if by removing the node, the whole network will be disjoined.

37. The method as in any one of embodiments 33-36 wherein child device change their frequency as well to guarantee available connection to the PAN coordinator or the converged coordinator, especially under multi-hop mesh topology and a short list of available PAN networks and their frequencies is maintained.

38. The method as in any one of the preceding embodiments, further comprising:
    utilizing Two-Step Active Channel Switching (TSACS).

39. The method as in embodiment 38, further comprising:
    sending a Disassociation Notification, wherein the device sends the disassociation notification command to the coordinator with the current PAN ID as the Destination PAN Identifier field and the coordinator address as the Destination Address field and the Disassociation Notification is sent over the current PAN network from which to switch with the desired PAN ID piggybacked over Disassociation Notification message.

40. The method as in any one of embodiments 38-39, further comprising:
    sending an Acknowledgement for the Disassociation Notification by the coordinator with Granted PAN ID contained, which could be the same be as or different from the desired PAN ID the device requested in Disassociation Notification.

41. The method as in any one of embodiments 38-40, further comprising:
    sending an Association command by the device to another potential coordinator with the Destination PAN Identifier field set to the identifier of the new PAN to which it will switch.

42. The method as in any one of the preceding embodiments, further comprising:
    utilizing One-Step Active Channel Switching (OSACS).

43. The method as in embodiment 42, further comprising:
    sending only one command message (either Association Request or Disassociation) to a coordinator over a new channel and waiting for Association Response from the coordinator and the Association Request (or Disassociation) command piggybacks information about the old PAN, so that the coordinator knows where the device comes from.

44. The method as in any one of embodiments 42-43, further comprising:

granting another channel to the device and informing the device of this channel, and asking the device to send an Acknowledge frame over the granted channel if channel switching to the new channel is not approved.

45. The method as in any one of the preceding embodiments, further comprising:
utilizing passive channel switching.

46. The method as in embodiment 45 wherein channel switching is triggered completely by the PAN coordinator or the converged coordinator.

47. The method as in embodiments 45-46, further comprising:
sending a Disassociation Notification message by the coordinator to the device containing disassociation reason and New PAN ID over the old channel.

48. The method as in embodiments 45-47, further comprising:
sending back an Acknowledgement to the coordinator by the device over the old channel.

49. The method as in embodiments 45-48, further comprising:
sending an Association Request to the coordinator over the new channel by the device.

50. The method as in embodiments 45-49, further comprising:
responding with an Association Response to the device over the new channel by the coordinator.

51. The method as in any one of the preceding embodiments, further comprising:
utilizing group-based channel switching.

52. The method as in embodiment 51 wherein a coordinator asks the PAN or converged coordinator for permission to move himself and his children to another PAN.

53. The method as in any one of embodiments 51-52 wherein a coordinator makes the request on behalf of its cluster to expedite channel switching compared to individually channel switching and by allowing devices to switch channel as a group, rather than individually, parent/child relationships is maintained during the switch, where the amount of time that it takes for the network to "heal" or "form" after the switch is reduced.

54. The method as in any one of embodiments 51-53, further comprising:
sending an "Association Request" to its parent over the old channel by the coordinator A informing its patent of the pending group switching;
sending a "New Disassociation Notification" to all its child devices to instruct them to switch to another channel.

55. The method as in any one of embodiments 51-54 wherein if coordinator A wants all its child devices to switch, it sets a broadcast address as the destination address for "New Disassociation Notification" command, so that all its devices can receive this command and trigger group switching.

56. The method as in any one of embodiments 51-55 wherein if coordinator A wants a subset of its child devices to switch, "New Disassociation Notification" command piggybacks the address of those devices, either contain a list of their short address or use Bloom Filter technique to reduce command frame length.

57. The method as in any one of embodiments 51-56 wherein all devices which need switch to another channel as instructed by "New Disassociation Notification" send back an acknowledgement through new channel using carrier sensing multiple access (CSMA) access to resolve potential collisions.

58. A wireless transmit receive unit (WTRU) configured to perform the method as in any one of embodiments 1-57.

59. The WTRU of embodiment 58, further comprising a transceiver.

60. The WTRU as in any of embodiments 58-59, further comprising a processor in communication with a transceiver.

61. The WTRU as in any of embodiments 58-60 wherein a processor is configured to perform a method as in any of embodiments 1-57.

62. A Node-B configured to perform the method as in any one of embodiments 1-57.

63. An integrated circuit configured to perform the method as in any one of embodiments 1-57.

64. A wireless transmit/receive unit (WTRU) acting as an element of a personal area network cluster comprising:
a processor configured to generate a channel switching message; and
a transmitter configured to send the channel switching message to a network coordinator; and
a receiver configured to receive a response from the network coordinator.

65. A wireless transmit/receive unit (WTRU) acting as an element of a personal area network cluster comprising:
a receiver configured to receive a notification from a network coordinator triggering channel switching; and
a processor configured to process the notification.

66. A coordinator node comprising:
at least one transceiver configured to communicate with at least one personal area network (PAN) device in a plurality of PANs;
the at least one transceiver configured to receive information related to the plurality of PANs;
a scheduler configured to determine, based on the received information, that at least one PAN device in at least one of the plurality of PANs will be switched to a different at least one of the plurality of PANs; and
the at least one transceiver further configured to switch the at least one PAN device to the different at least one PAN based on the received information.

67. The coordinator node of embodiment 66, wherein the at least one transceiver is further configured to switch the at least one PAN device by:
transmitting a Disassociation Notification to the at least one PAN device;
receiving an Association Request from the at least one PAN device; and
transmitting an Association Response to the at least one PAN device.

68. The coordinator node of embodiment 67, wherein the at least one transceiver is further configured to switch the at least one PAN device by transmitting an Acknowledgement to the at least one PAN device.

69. The coordinator node of embodiment 67, wherein the at least one transceiver is further configured to:
transmit the Disassociation Notification via a first channel;
receive the Association Request via a second channel; and
transmit the Association response via the second channel.

70. The coordinator node of embodiment 67, wherein the Disassociation Notification includes a Disassociation Reason and a Desired PAN ID.

71. The coordinator node of embodiment 66, wherein the at least one transceiver is further configured to switch the at least one PAN device by:
receiving a Disassociation Notification from the at least one PAN device;

transmitting an Acknowledgement to the at least one PAN device;
receiving an Association Request from the at least one PAN device; and
transmitting an Association Response to the at least one PAN device.

72. The coordinator node of embodiment 71, wherein the at least one transceiver is further configured to:
receive the Disassociation Notification and transmit the Acknowledgement via a first channel; and
receive the Association Request and transmit the Association Response via a second channel.

73. The coordinator node of embodiment 71, wherein the Disassociation Notification includes a Disassociation Reason and a Desired PAN ID and the Acknowledgement includes the Disassociation Reason a Granted PAN ID.

74. The coordinator node of embodiment 66, wherein the at least one transceiver is further configured to switch the at least one PAN device by:
receiving an Association Request from the at least one PAN device via a new channel; and
transmitting an Association Response to the at least one PAN device via the new channel,
wherein the new channel relates to a new PAN that the at least one PAN device is attempting to switch to.

75. The coordinator node of embodiment 74, wherein the Association Request includes a Disassociation Reason and an Old PAN ID and the Association Response includes a Granted PAN ID.

76. The coordinator node of embodiment 66, wherein the at least one transceiver is further configured to switch the at least one PAN device by:
transmitting a Disassociation Notification to the at least one PAN device;
receiving an Association Request from the at least one PAN device; and
transmitting an Association Response to the at least one PAN device.

77. The coordinator node of embodiment 76, wherein the at least one transceiver is further configured to switch the at least one PAN device by receiving an Acknowledgement from the at least one PAN device.

78. The coordinator node of embodiment 76, wherein the Disassociation Notification includes a Disassociation Reason and a New PAN ID.

79. The coordinator node of embodiment 66, wherein the at least one transceiver is further configured to switch the at least one PAN device by:
transmitting an Association Request to a parent coordinator, the Association Request including information regarding switching at least two devices to a new channel;
receiving an Acknowledgement from the parent coordinator; and
transmitting a New Disassociation Notification to the at least two devices.

80. The coordinator node of embodiment 79, wherein the Association Request includes a Disassociation Reason and an indication that group switching is requested, and the New Disassociation Notification includes the Disassociation Reason and a New PAN ID.

81. The coordinator node of embodiment 66, wherein the at least one transceiver is configured to communicate via a wireless personal area network (WPAN) standard.

82. The coordinator node of embodiment 66, wherein the scheduler includes:
at least one memory device configured to store information regarding each of the plurality of PANs; and
a central registrar configured to store information related to each of the at least one PAN devices,
the scheduler configured to use the information regarding each of the plurality of PANS and the information related to each of the at least PAN devices to determine that the at least one PAN device in at least one of the plurality of PANs will be switched to the different at least one of the plurality of PANs.

83. The coordinator node of embodiment 1, wherein the scheduler is configured to determine that the at least one PAN device in at least one of the plurality of PANs will be switched to the different at least one of the plurality of PANs by considering at least one of traffic conditions, load balancing, congestion control, reliability, isolation, service differentiation, interference management, or protection factors in one or more of the plurality of PANs.

84. The coordinator node of embodiment 1, wherein the scheduler is further configured to determine a number of the at least one transceivers that are in use at a given time.

85. A method comprising:
communicating with at least one personal area network (PAN) device in a plurality of PANs via at least one transceiver;
receiving information related to the plurality of PANs;
determining, based on the received information, that at least one PAN device in at least one of the plurality of PANs will be switched to a different at least one of the plurality of PANs; and
switching the at least one PAN device to the different at least one PAN based on the received information.

86. A wireless transmit/receive unit (WTRU) configured to perform the features of any one of embodiments 66-85.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:
1. A computer processing system for switching at least one personal area network (PAN) device from a first PAN in a plurality of personal area networks (PANs) to a second PAN in the plurality of personal area network (PANs), the system comprising:
a processor configured to:
(i) receive, a disassociation notification message, from the at least one PAN device to switch from the first PAN to the second PAN, that comprises an identification of the second PAN;
(ii) generate, in response to the disassociation message, a first instruction for the at least one PAN device to switch to the second PAN, the first instruction comprising an acknowledgement instruction, for sending via a first channel to the at least one PAN device that comprises the identification of the second PAN and a disassociation reason;

(iii) receive, an association request, sent by the at least one PAN device, and (iv) generate, a second instruction, in response to the association request, that comprises an association response, for sending via a second channel to the at least one PAN device; and a memory configured to store the first and the second instruction.

2. The system of claim 1, wherein the association request further comprises an association message, sent by the at least one PAN device to the system, that comprises an identification of the second PAN, and the second instruction comprises an association response, for sending via a first channel to the at least one PAN device, that comprises the identification of the second PAN and that is sent in response to an association message.

3. The system of claim 1, wherein the processor is further configured to use the identification the second PAN in generating the instruction.

4. A method for switching at least one personal area network (PAN) device from a first PAN in a plurality of personal area networks (PANs) to a second PAN in the plurality of personal area network (PANs), the system comprising:

receiving, at a central processing system for the plurality of PANs, a disassociation notification message sent by the at least one PAN device that comprises an identification of the second PAN, sent by the at least one PAN device indicating that the at least one PAN device is requesting to switch from the first PAN to the second PAN;

sending, in response to the step of receiving, from the central processing system to the at least one PAN device, an acknowledgement instruction in response to the disassociation notification message, for the at least one PAN device to switch from the first PAN to the second PAN, via a first channel to the at least PAN device, that comprises the identification of the second PAN;

receiving an association request, from the at least one PAN device via a second channel; and sending an association response, to the at least one PAN device, via the second channel, in response to the association request.

5. The method of claim 4, wherein the acknowledgement instruction further comprises a disassociation reason.

6. The method of claim 4, wherein receiving the association request, further comprises, receiving the association message via a first channel, sent by the at least one personal area network device to the central processing system, and sending an association response further comprises sending an identification of the second PAN.

7. The method of claim 6, further comprising receiving an acknowledgement message at the central processing system that was sent by the at least one PAN device via the second channel.

* * * * *